US012407099B2

(12) United States Patent
Thakur et al.

(10) Patent No.: US 12,407,099 B2
(45) Date of Patent: Sep. 2, 2025

(54) PHASE SHIFTER FOR BASE STATION ANTENNA

(71) Applicant: Outdoor Wireless Networks LLC, Claremont, NC (US)

(72) Inventors: Jitendra Thakur, Ballia (IN); Kumara Swamy Kasani, Godavarikhahani (IN); Kamalakar Yeddula, Naddvala (IN)

(73) Assignee: Outdoor Wireless Networks LLC, Richardson, TX (US)

( * ) Notice: Subject to any disclaimer, the term of this patent is extended or adjusted under 35 U.S.C. 154(b) by 301 days.

(21) Appl. No.: 18/366,785

(22) Filed: Aug. 8, 2023

(65) Prior Publication Data

US 2024/0063539 A1 Feb. 22, 2024

Related U.S. Application Data

(60) Provisional application No. 63/398,911, filed on Aug. 18, 2022.

(51) Int. Cl.
*H01Q 3/32* (2006.01)

(52) U.S. Cl.
CPC .................................... *H01Q 3/32* (2013.01)

(58) Field of Classification Search
CPC .. H01P 1/184; H01P 1/18; H01Q 3/30; H01Q 3/32; H01Q 1/246
See application file for complete search history.

(56) References Cited

U.S. PATENT DOCUMENTS

| | | | | |
|---|---|---|---|---|
| 7,170,466 | B2 * | 1/2007 | Janoschka | H01P 1/184 343/882 |
| 7,298,233 | B2 * | 11/2007 | Zimmerman | H01Q 1/246 342/372 |
| 7,358,922 | B2 * | 4/2008 | Le | H01Q 1/246 343/810 |
| 7,463,190 | B2 * | 12/2008 | Zimmerman | H01Q 3/32 333/156 |
| 7,907,096 | B2 * | 3/2011 | Timofeev | H01Q 3/32 333/156 |
| 8,847,702 | B2 * | 9/2014 | Lai | H01P 1/184 333/128 |
| 10,424,839 | B2 * | 9/2019 | Li | H01Q 1/246 |
| 10,581,163 | B2 * | 3/2020 | Schmutzler | F16H 25/20 |
| 10,833,407 | B2 * | 11/2020 | Yang | H01Q 1/246 |
| 10,854,967 | B2 * | 12/2020 | Zimmerman | H01Q 1/246 |

(Continued)

*Primary Examiner* — Peter M Bythrow
(74) *Attorney, Agent, or Firm* — Myers Bigel, P.A.

(57) ABSTRACT

A phase shifter, which may include an input port configured to receive a radio frequency (RF) signal. The phase shifter may include a first conductive trace that is electrically connected to a first output port. The first output port may be configured to output a first phase-shifted sub-component of the RF signal. The phase shifter may include a wiper configured to couple the input port to the first conductive trace. The wiper may include a first conductive pad adapted to slide on the first conductive trace. The first conductive trace may include a first metal trace that has a plurality of slits formed therein where the metal is omitted. Each slit may include an enlarged portion formed along a length thereof. The enlarged portion of at least some of the slits may be formed at a tip end of the slit and/or at a middle of the length of the slit.

20 Claims, 11 Drawing Sheets

(56) References Cited

U.S. PATENT DOCUMENTS

| | | | | |
|---|---|---|---|---|
| 2005/0046514 | A1* | 3/2005 | Janoschka | H01P 1/184 |
| | | | | 333/156 |
| 2006/0077098 | A1* | 4/2006 | Zimmerman | H01Q 3/32 |
| | | | | 342/372 |
| 2011/0063049 | A1* | 3/2011 | Bradley | H01P 1/184 |
| | | | | 333/161 |
| 2011/0267231 | A1* | 11/2011 | Le | F16H 37/04 |
| | | | | 342/359 |
| 2015/0200467 | A1* | 7/2015 | Kurk | H01Q 1/241 |
| | | | | 343/853 |
| 2018/0287255 | A1* | 10/2018 | Zimmerman | H01Q 3/08 |
| 2020/0006848 | A1* | 1/2020 | Ding | H01P 1/184 |
| 2020/0321697 | A1* | 10/2020 | Zimmerman | H01Q 21/26 |
| 2021/0075402 | A1* | 3/2021 | Guo | H01P 1/184 |
| 2021/0367313 | A1* | 11/2021 | Chen | H01P 1/184 |
| 2022/0006167 | A1* | 1/2022 | P | H01Q 21/08 |
| 2022/0037753 | A1* | 2/2022 | Tang | H01Q 19/10 |
| 2023/0307831 | A1* | 9/2023 | Li | H01Q 1/246 |

* cited by examiner

| Freq (GHz) | Meander Track (Base) Phase (deg) | Circular (D=0.7mm) Phase (deg) | Delta Phase (deg) | Circular (D=1mm) Phase (deg) | Delta Phase (deg) | Semi-circular Phase (deg) | Delta Phase (deg) | Square/Rectangular Phase (deg) | Delta Phase (deg) | Triangular Phase (deg) | Delta Phase(deg) |
|---|---|---|---|---|---|---|---|---|---|---|---|
| 0.617 | -1.89547 | -22.658394 | -20.7629 | -39.46117906 | -37.5657 | -29.983042 | -28.0876 | -36.22412751 | -34.3287 | -21.90176 | -20.00629 |
| 0.63615 | -13.129 | -36.900554 | -23.7716 | -54.25519078 | -41.1262 | -44.456062 | -31.3271 | -50.89702551 | -37.768 | -36.09898 | -22.96999 |
| 0.6553 | -24.3657 | -46.393501 | -22.0278 | -64.11471433 | -39.749 | -54.103875 | -29.7382 | -60.67886623 | -36.3132 | -45.56382 | -21.19811 |
| 0.67445 | -35.6061 | -60.63638 | -25.0303 | -78.90862358 | -43.3025 | -68.582834 | -32.9767 | -75.36122417 | -39.7551 | -59.76801 | -24.1619 |
| 0.6936 | -46.8506 | -70.136724 | -23.2861 | -88.77979077 | -41.9292 | -78.244457 | -31.3939 | -85.16102412 | -38.3104 | -69.24508 | -22.39448 |
| 0.71275 | -58.0995 | -84.397795 | -26.2983 | -103.6069705 | -45.5075 | -92.755165 | -34.6557 | -99.88456622 | -41.7851 | -83.47508 | -25.37559 |
| 0.7319 | -69.3529 | -93.912843 | -24.56 | -113.5082726 | -44.1554 | -102.44247 | -33.0896 | -109.7182489 | -40.3654 | -92.97183 | -23.61896 |
| 0.75105 | -80.6106 | -108.18654 | -27.5859 | -128.3872434 | -47.7766 | -116.99371 | -36.3831 | -124.4965263 | -43.8859 | -107.2312 | -26.6208 |
| 0.7702 | -91.8726 | -117.7257 | -25.8531 | -138.3245707 | -46.452 | -126.70713 | -34.8346 | -134.3663646 | -42.4938 | -116.7459 | -24.87336 |
| 0.78935 | -103.138 | -132.02805 | -28.8898 | -153.2562668 | -50.118 | -141.29383 | -38.1556 | -149.1949048 | -46.0567 | -131.0283 | -27.8901 |
| 0.8085 | -114.407 | -141.56816 | -27.161 | -163.2269208 | -48.8197 | -151.0281 | -36.6209 | -159.0947599 | -44.6876 | -140.5558 | -26.14859 |
| 0.82765 | -125.679 | -155.88615 | -30.2072 | -178.2062444 | -52.5273 | -165.64294 | -39.964 | -173.9636333 | -48.2847 | -154.8549 | -29.17592 |
| 0.8468 | -136.953 | -165.43743 | -28.4843 | -188.2082043 | -51.2551 | -175.39518 | -38.4421 | -183.8884935 | -46.9354 | -164.3931 | -27.44001 |
| 0.86595 | -148.229 | -179.77547 | -31.5463 | -203.2363612 | -55.0072 | -190.03836 | -41.8092 | -198.7948173 | -50.5657 | -178.71 | -30.48093 |
| 0.8851 | -159.507 | -189.3431 | -29.8364 | -213.2732514 | -53.7665 | -199.81153 | -40.3048 | -208.7458961 | -49.2392 | -188.2623 | -28.75557 |
| 0.90425 | -170.786 | -203.70991 | -32.9242 | -228.3571649 | -57.5715 | -214.48927 | -43.7036 | -223.6937096 | -52.908 | -202.6037 | -31.81805 |
| 0.9234 | -182.066 | -213.29792 | -31.2322 | -238.431291 | -56.3656 | -224.28597 | -42.2203 | -233.6721636 | -51.6065 | -212.1732 | -30.10749 |
| 0.94255 | -193.347 | -227.69109 | -34.3442 | -253.5625793 | -60.2157 | -238.99313 | -45.6463 | -248.6532122 | -55.3064 | -226.5365 | -33.18965 |
| 0.9617 | -204.629 | -237.28824 | -32.659 | -263.6543151 | -59.0251 | -248.79908 | -44.1698 | -258.6412497 | -54.012 | -236.1127 | -31.48344 |
| 0.98085 | -215.913 | -251.66896 | -35.7555 | -278.7708487 | -62.8574 | -263.48888 | -47.5755 | -273.5997511 | -57.6863 | -250.4613 | -34.5479 |
| 1 | -227.201 | -261.23042 | -34.0299 | -288.8104108 | -61.6099 | -273.25076 | -46.0503 | -283.5347236 | -56.3342 | -260.0017 | -32.80123 |

FIG. 11

PHASE SHIFTER FOR BASE STATION ANTENNA

CROSS-REFERENCE TO RELATED APPLICATION

The present application claims the benefit of priority to U.S. Provisional Application No. 63/398,911, filed on Aug. 18, 2022, and the entire contents of the above-identified application are incorporated by reference as if set forth herein.

TECHNICAL FIELD

The present disclosure relates to communication systems and, in particular, to base station antennas having wiper type phase shifters.

BACKGROUND

The information in this section merely provides background information related to the present disclosure and may not constitute prior art(s) to the present disclosure.

Cellular communications systems are used to provide wireless communications to fixed and mobile subscribers (herein "users"). A cellular communications system may include a plurality of base stations that each provide wireless cellular service for a specified coverage area that is typically referred to as a "cell." Each base station may include one or more base station antennas that are used to transmit radio frequency ("RF") signals to, and receive RF signals from, the users that are within the cell served by the base station. Base station antennas are directional devices that can concentrate the RF energy that is transmitted in certain directions (or received from those directions). The ""gain" of a base station antenna in a given direction is a measure of the ability of the antenna to concentrate the RF energy in that particular direction. The "radiation pattern" of a base station antenna is compilation of the gain of the antenna across all different directions. The radiation pattern of a base station antenna is typically designed to service a pre-defined coverage area such as the cell or a portion thereof that is typically referred to as a "sector." The base station antenna may be designed to have maximum gain levels throughout its pre-defined coverage area, and it is typically desirable that the base station antenna have much lower gain levels outside of the coverage area to reduce interference between sectors/cells. Early base station antennas typically had a fixed radiation pattern, meaning that once a base station antenna was installed, and its radiation pattern could not be changed unless a technician physically reconfigured the antenna. Unfortunately, such manual reconfiguration of base station antennas after deployment, which could become necessary due to changed environmental conditions or the installation of additional base stations, was typically difficult, expensive and time-consuming.

More recently, base station antennas have been deployed that have radiation patterns that can be reconfigured from a remote location by transmitting control signals to the antenna. Base station antennas having such capabilities are typically referred to as remote electronic tilt ("RET") antennas. The most common changes to the radiation pattern are changes in the down tilt angle (i.e., the elevation angle) and/or the azimuth angle. RET antennas allow wireless network operators to remotely adjust the radiation pattern of the antenna by transmitting control signals to the antenna that electronically alter the RF signals that are transmitted and received by the antenna.

Base station antennas typically comprise a linear array or a two-dimensional array of radiating elements such as patch, dipole or crossed dipole radiating elements. In order to electronically change the down tilt angle of these antennas, a phase progression may be applied to the sub-components of an RF signal that are fed to the radiating elements of the array, as is well understood by those of skill in the art. Such a phase progression may be applied by adjusting the settings on an adjustable phase shifter that is positioned along the RF transmission path between a radio and the individual radiating elements of the base station antenna. One widely used type of phase shifter is an electromechanical "wiper" phase shifter that includes a main printed circuit board and a "wiper" printed circuit board that may be moved (e.g., rotated) above the main printed circuit board. Such wiper phase shifters typically divide an input RF signal that is received at the main printed circuit board into a plurality of sub-components, and then capacitively couple at least some of these sub-components to the wiper printed circuit board. The sub-components of the RF signal may be capacitively coupled from the wiper printed circuit board back to the main printed circuit board along one or more transmission traces. Each end of each transmission trace may be connected to a radiating element or to a sub-group of radiating elements. By physically (mechanically) rotating the wiper printed circuit board above the main printed circuit board, the locations where the sub-components of the RF signal capacitively couple back to the main printed circuit board may be changed, which thus changes the length of the respective transmission path from the phase shifter to an associated radiating element for each sub-component of the RF signal. The changes in these path lengths result in changes in the phases of the respective sub-components of the RF signal, and thus the phase changes along the different paths will be different. Thus, the above-described wiper phase shifters may be used to apply a phase progression to the sub-components of an RF signal that are applied to each radiating element (or sub-group of radiating elements). Exemplary phase shifters of this variety are discussed in U.S. Pat. No. 7,907,096 to Timofeev, the disclosure of which is hereby incorporated herein in its entirety.

However, known phase shifters configured for a base station antenna have size constraints due to a size of the base station antenna and other elements mounted on a reflector of the base station antenna. Accordingly, a physical size of the phase shifter is limited and thus the phase shifter offers limited length of transmission and limited tilt angle, depending upon the physical length/size of the phase shifter.

Therefore, there is a need for an improved phase shifter for a base station antenna that addresses at least the problems identified above and provide more phase tilt/phase shift with the same size or a reduced size phase shifter.

SUMMARY

The one or more shortcomings of the prior art are overcome by the system as claimed, and additional advantages are provided through the provision of the system as claimed in the present disclosure. Additional features and advantages are realized through the techniques of the present disclosure. Other embodiments and aspects of the disclosure are described in detail herein and are considered a part of the claimed disclosure.

Pursuant to the embodiments of the present disclosure, in an aspect, a phase shifter is disclosed. The phase shifter comprises an input port configured to receive a radio frequency (RF) signal. The phase shifter further comprises a first conductive trace that is electrically connected to a first output port. The first output port is configured to output a first phase-shifted sub-component of the RF signal. The phase shifter furthermore comprises a wiper configured to couple the input port to the first conductive trace. The wiper comprises a first conductive pad adapted to slide on the first conductive trace. The first conductive trace comprises a first metal trace that has a plurality of slits formed therein where the metal is omitted. Further, each slit includes an enlarged portion formed along a length thereof.

In another non-limiting embodiment of the present disclosure, the plurality of slits comprises a plurality of first transverse slits that extend from a first side edge of the first metal trace toward a second side edge that is opposite the first side edge. The plurality of slits further comprises a plurality of second transverse slits that extend from the second side edge of the first metal trace toward the first side edge.

In another non-limiting embodiment of the present disclosure, the first conductive trace is a meandered trace.

In another non-limiting embodiment of the present disclosure, the meandered trace forms a periodic curve.

In another non-limiting embodiment of the present disclosure, the first conductive trace is electrically connected to a second output port. The second output port is configured to output a second phase-shifted sub-component of the RF signal.

In another non-limiting embodiment of the present disclosure, the phase shifter comprises a second conductive trace that is electrically connected to a third output port. The third output port is configured to output a third phase-shifted sub-component of the RF signal. The wiper is further configured to couple the input port to the second conductive trace. The wiper comprises a second conductive pad adapted to slide on the second conductive trace. The second conductive trace comprises a second metal trace that has a plurality of slits formed therein where the metal is omitted. Each slit includes an enlarged portion formed along a length thereof.

In another non-limiting embodiment of the present disclosure, the enlarged portion of at least some of the slits is formed at a tip end of the slit.

In another non-limiting embodiment of the present disclosure, the enlarged portion of at least some of the slits is formed at a middle of the length of the slit.

In another non-limiting embodiment of the present disclosure, at least some of the slits include a first enlarged portion formed at a tip end of the slit and a second enlarged portion formed at a middle of the length of the slit.

In another non-limiting embodiment of the present disclosure, the first conductive trace extends linearly between the first output port and the second output port.

In another non-limiting embodiment of the present disclosure, the first conductive trace extends between the first output port and the second output port in a shape of an arc.

In another non-limiting embodiment of the present disclosure, the phase shifter comprises a dielectric substrate that has a first side on which the first conductive trace is formed and a second side. A defective ground structure is provided on the second side of the dielectric substrate. The defective ground structure comprises a metal sheet having a plurality of openings therein where the metal is omitted.

In another non-limiting embodiment of the present disclosure, the first conductive trace vertically overlaps at least some of the openings in the defective ground structure.

In another non-limiting embodiment of the present disclosure, the second conductive trace is electrically connected to a fourth output port. The fourth output port is configured to output a fourth phase-shifted sub-component of the RF signal.

In another non-limiting embodiment of the present disclosure, the phase shifter further comprises a third conductive trace coupled to a fifth output port. The fifth output port is configured to output a fifth phase-shifted sub-component of the RF signal.

In another non-limiting embodiment of the present disclosure, the enlarged portion of at least some of the slits have a shape of a circle, semi-circle, triangle, or square.

Pursuant to the embodiments of the present disclosure, in another aspect, a phase shifter is disclosed. The phase shifter comprises an input port configured to receive a radio frequency (RF) signal. The phase shifter further comprises a first conductive trace extending between a first output port and a second output port, and a second conductive trace extending between a third output port and a fourth output port. Each of the first output port, the second output port, the third output port and the fourth output port is configured to output a respective phase-shifted sub-component of the RF signal. The phase shifter furthermore comprises a wiper configured to couple the input port to the first conductive trace and the second conductive trace. The wiper comprises a first conductive pad and a second conductive pad adapted to slide on the first conductive trace and the second conductive trace, respectively. Further, slits extend into the first conductive trace and the second conductive trace so that the first conductive trace and the second conductive trace are meandered traces. Each slit includes an enlarged portion formed along a length thereof.

In another non-limiting embodiment of the present disclosure, each meandered trace forms a periodic curve.

In another non-limiting embodiment of the present disclosure, the enlarged portion of at least some of the slits is formed either at a tip end of the slit or at a middle of the length of the slit.

In another non-limiting embodiment of the present disclosure, at least some of the slits include a first enlarged portion formed at a tip end of the slit, and a second enlarged portion formed at a middle of the length of the slit.

In another non-limiting embodiment of the present disclosure, the first conductive trace and the second conductive trace extend linearly between their respective output ports.

In another non-limiting embodiment of the present disclosure, the first conductive trace and the second conductive trace extend between their respective output ports in a shape of an arc.

In another non-limiting embodiment of the present disclosure, the phase shifter further comprises a dielectric substrate that has a first side on which the first conductive trace and the second conductive trace are formed and a second side. A defective ground structure is provided on the second side of the dielectric substrate. The defective ground structure comprises a metal sheet having a plurality of openings therein where the metal is omitted.

In another non-limiting embodiment of the present disclosure, the first conductive trace and/or the second conductive trace vertically overlaps at least some of the openings in the defective ground structure.

In another non-limiting embodiment of the present disclosure, the phase shifter comprises a third conductive trace coupled to a fifth output port. The fifth output port is configured to output an additional phase-shifted sub-component of the RF signal.

In another non-limiting embodiment of the present disclosure, the enlarged portion of at least some of the slits has a shape of a circle, semi-circle, triangle, or square.

Within the scope of the present disclosure, the phase shifter of the present disclosure offers an increased electrical length of conductive trace(s) compared to the known phase shifters. The phase shifter of the present disclosure facilitates increasing the electrical length of the conductive trace without increasing the physical length of the phase shifter. In fact, the phase shifter of the present disclosure facilitates an increased electrical length of the conductive trace with same or reduced physical length of the phase shifter. Accordingly, with the phase shifter of the present disclosure, more phase shift/phase tilt can be obtained without increasing the physical size of the phase shifter and without effecting the other performances, for example, return loss, amplitude, etc., of the phase shifter.

Moreover, the enlarged portions formed along the length of the slits provide more phase tilt/phase shift on the conductive trace length, and aids in increasing the impedance offered by the phase shifter. Further, the enlarged portions comprised of no sharp edges, for example, the enlarged portions formed in the shape of circle, provides uniform surface and reduces return loss in the phase shifter. Also, the defective ground structure aids in further reducing the return loss in the phase shifter.

It is to be understood that the aspects and embodiments of the disclosure described above may be used in any combination with each other. Several of the aspects and embodiments may be combined together to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF FIGURES

The novel features and characteristics of the disclosure are set forth in the description. The disclosure itself, however, as well as a preferred mode of use, further objectives, and advantages thereof, will best be understood by reference to the following description of some illustrative embodiments when read in conjunction with the accompanying drawings. One or more embodiments are now described, by way of example only, with reference to the accompanying drawings wherein like reference numerals represent like elements and in which:

FIG. 11 is a table that provides a difference in phase shift offered by the phase shifter comprising the conductive trace of the present disclosure compared to the phase shifter having a meandered track (base) at any given frequency.

Figure 1:
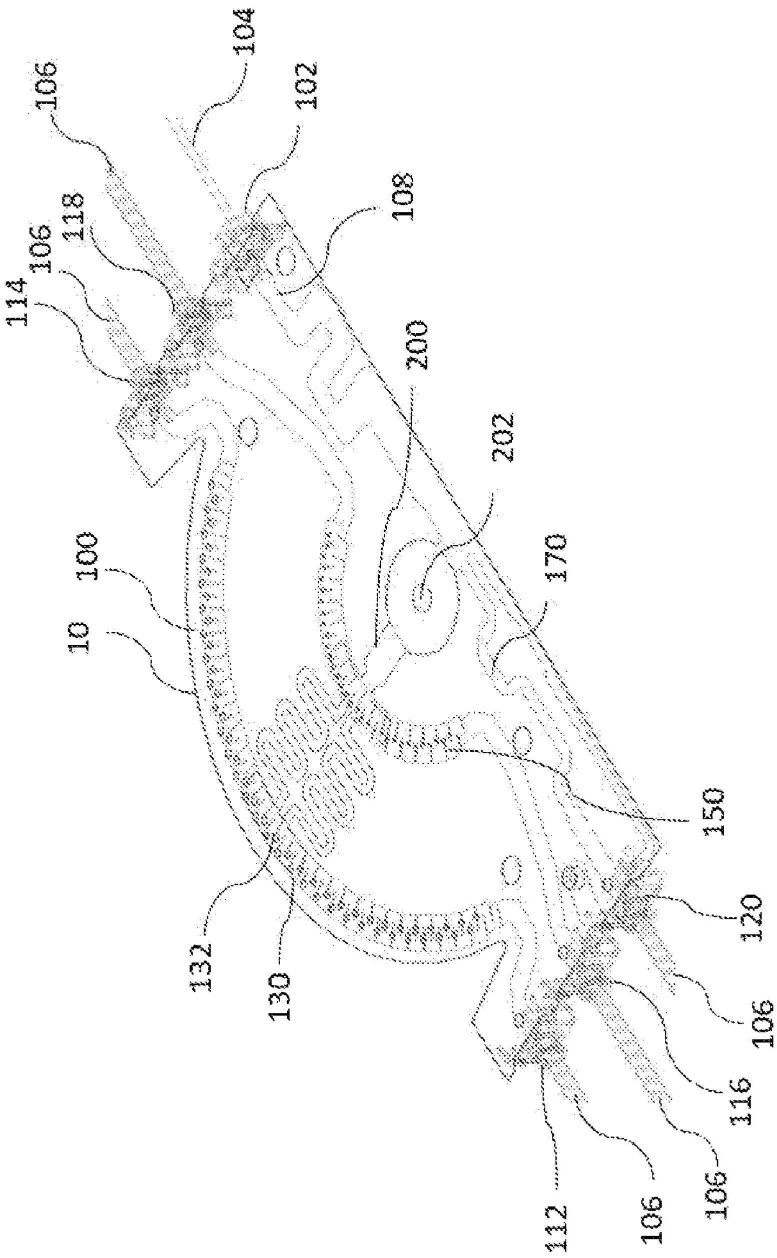
FIG. 1 is a perspective view of a phase shifter for a base station antenna.

Skilled artisans will appreciate that elements in the drawings are illustrated for simplicity and have not necessarily been drawn to scale. For example, the dimensions of some of the elements in the drawings may be exaggerated relative to other elements to help to improve understanding of embodiments of the present disclosure.

DETAILED DESCRIPTION

While the disclosure is susceptible to various modifications and alternative forms, specific embodiments thereof have been shown by way of example in the figures and will be described in detail below. It should be understood, however that it is not intended to limit the disclosure to the particular forms disclosed, but on the contrary, the disclosure is to cover all modifications, equivalents, and alternatives falling within the scope of the disclosure as defined by the appended claims.

Before describing detailed embodiments, it may be observed that the novelty and inventive step that are in accordance with the present disclosure resides in a phase shifter. It is to be noted that a person skilled in the art can be motivated from the present disclosure and modify the various constructions of the phase shifter. However, such modification should be construed within the scope of the present disclosure. Accordingly, the drawings are showing only those specific details that are pertinent to understanding the embodiments of the present disclosure so as not to obscure the disclosure with details that will be readily apparent to those of ordinary skill in the art having benefit of the description herein.

In the present disclosure, the term "exemplary" is used herein to mean "serving as an example, instance, or illustration." Any embodiment or implementation of the present subject matter described herein as "exemplary" is not necessarily to be construed as preferred or advantageous over other embodiments.

The terms "comprises", "comprising", or any other variations thereof, are intended to cover a non-exclusive inclusions, such that a device that comprises a list of components does not include only those components but may include other components not expressly listed or inherent to such device. In other words, one or more elements in a system or apparatus proceeded by "comprises . . . a" does not, without more constraints, preclude the existence of other elements or additional elements in the system or apparatus.

The terms like "at least one" and "one or more" may be used interchangeably or in combination throughout the description.

Pursuant to the embodiments of the present disclosure, in an aspect, a phase shifter is disclosed. The phase shifter comprises an input port configured to receive a radio frequency (RF) signal. The phase shifter further comprises a first conductive trace that is electrically connected to a first output port. The first output port is configured to output a first phase-shifted sub-component of the RF signal. The phase shifter furthermore comprises a wiper configured to couple the input port to the first conductive trace. The wiper comprises a first conductive pad adapted to slide on the first conductive trace. The first conductive trace comprises a first metal trace that has a plurality of slits formed therein where the metal is omitted. Further, each slit includes an enlarged portion formed along a length thereof. In an embodiment, the plurality of slits comprises a plurality of first transverse slits that extend from a first side edge of the first metal trace toward a second side edge that is opposite the first side edge. The plurality of slits further comprises a plurality of second transverse slits that extend from the second side edge of the first metal trace toward the first side edge. Further, the first conductive trace is a meandered trace. The meandered trace forms a periodic curve.

In an embodiment, the first conductive trace is electrically connected to a second output port. The second output port is configured to output a second phase-shifted sub-component of the RF signal. In a further embodiment, the phase shifter comprises a second conductive trace that is electrically connected to a third output port. The third output port is configured to output a third phase-shifted sub-component of the RF signal. The wiper is further configured to couple the input port to the second conductive trace. The wiper comprises a second conductive pad adapted to slide on the second conductive trace. The second conductive trace comprises a second metal trace that has a plurality of slits formed therein where the metal is omitted. Each slit includes an enlarged portion formed along a length thereof. Further, the second conductive trace is electrically connected to a fourth output port. The fourth output port is configured to output a fourth phase-shifted sub-component of the RF signal. Moreover, the phase shifter further comprises a third conductive trace coupled to a fifth output port. The fifth output port is configured to output a fifth phase-shifted sub-component of the RF signal.

In an embodiment, the enlarged portion of at least some of the slits is formed at a tip end of the slit. In another embodiment, the enlarged portion of at least some of the slits is formed at a middle of the length of the slit. In yet another embodiment, at least some of the slits include a first enlarged portion formed at a tip end of the slit and a second enlarged portion formed at a middle of the length of the slit. The enlarged portion of at least some of the slits have a shape of a circle, semi-circle, triangle, or square.

In an embodiment, the first conductive trace extends linearly between the first output port and the second output port. In an alternate embodiment, the first conductive trace extends between the first output port and the second output port in a shape of an arc.

In a further embodiment, the phase shifter comprises a dielectric substrate that has a first side on which the first conductive trace is formed and a second side. A defective ground structure is provided on the second side of the dielectric substrate. The defective ground structure comprises a metal sheet having a plurality of openings therein where the metal is omitted. The first conductive trace vertically overlaps at least some of the openings in the defective ground structure.

Pursuant to the embodiments of the present disclosure, in another aspect, a phase shifter is disclosed. The phase shifter comprises an input port configured to receive a radio frequency (RF) signal. The phase shifter further comprises a first conductive trace extending between a first output port and a second output port, and a second conductive trace extending between a third output port and a fourth output port. Each of the first output port, the second output port, the third output port and the fourth output port is configured to output a respective phase-shifted sub-component of the RF signal. The phase shifter furthermore comprises a wiper configured to couple the input port to the first conductive trace and the second conductive trace. The wiper comprises a first conductive pad and a second conductive pad adapted to slide on the first conductive trace and the second conductive trace, respectively. Further, slits extend into the first conductive trace and the second conductive trace so that the first conductive trace and the second conductive trace are meandered traces. Each slit includes an enlarged portion formed along a length thereof. In an embodiment, each meandered trace forms a periodic curve. The phase shifter comprises a third conductive trace coupled to a fifth output port. The fifth output port is configured to output an additional phase-shifted sub-component of the RF signal.

In an embodiment, the enlarged portion of at least some of the slits is formed either at a tip end of the slit or at a middle of the length of the slit. At least some of the slits include a first enlarged portion formed at a tip end of the slit, and a second enlarged portion formed at a middle of the length of the slit. The enlarged portion of at least some of the slits has a shape of a circle, semi-circle, triangle, or square.

In an embodiment, the first conductive trace and the second conductive trace extend linearly between their respective output ports. Alternatively, the first conductive trace and the second conductive trace extend between their respective output ports in a shape of an arc.

In an embodiment, the phase shifter further comprises a dielectric substrate that has a first side on which the first conductive trace and the second conductive trace are formed and a second side. A defective ground structure is provided on the second side of the dielectric substrate. The defective ground structure comprises a metal sheet having a plurality of openings therein where the metal is omitted. The first conductive trace and/or the second conductive trace vertically overlaps at least some of the openings in the defective ground structure.

It is to be understood that the aspects and embodiments of the disclosure described above may be used in any combination with each other. Several of the aspects and embodiments may be combined together to form a further embodiment of the disclosure.

Reference will now be made to the exemplary embodiments of the disclosure, as illustrated in the accompanying drawings. Wherever possible same numerals will be used to refer to the same or like parts.

Embodiments of the present disclosure are described in the following paragraphs with reference to FIGS. 1 to 11. In FIGS. 1 to 11, the same element or elements which have same functions are indicated by the same reference signs.

Modern base station antennas often include two, three or more linear arrays of radiating elements. If the linear arrays include cross-polarized radiating elements, then a separate phase shifter is provided for each polarization (i.e., two phase shifters per linear array). Moreover, separate transmit and receive phase shifters are often provided for each linear array so that the transmit and receive radiation patterns may be independently adjusted, which may again double the number of phase shifters. Additionally, in some cases, some (or all) of the linear arrays may be formed using wideband radiating elements that support service in multiple frequency bands (e.g., the 700 MHz and 800 MHz frequency bands or two or more frequency bands within the 1.7-2.7 GHz frequency range). When such wideband linear arrays are used, separate phase shifters may be provided for each frequency band within the broader operating frequency range of the radiating elements. Thus, modern base station antennas may include a large number of phase shifters.

In an exemplary embodiment, a base station antenna comprises, among other things, radio frequency (RF) ports, a plurality of linear arrays of radiating elements and phase shifters. The plurality of linear arrays may comprise a total of three linear arrays that each include five radiating elements. It will be appreciated, however, that the number of linear arrays and the number of radiating elements included in each array may be varied. Each may be fed by a feed network. Each feed network connects the radiating elements of one of the linear arrays to an RF port.

In an embodiment, the radiating elements may be cross-polarized radiating elements, such as +45°/−45° slant dipole radiating elements, that may transmit and receive RF signals at two orthogonal polarizations. Any other appropriate radiating element including, for example, single dipole radiating elements or patch radiating elements (including cross-polarized patch radiating elements) may also be used in the antenna. When cross-polarized radiating elements are used, two feed networks may be provided, a first of which carries RF signals having the first polarization (e.g., +45°) between the radiating elements and a first RF port and the second of which carries RF signals having the second polarization (e.g., −45°) between the radiating elements and a second RF port.

Further, an input of each phase shifter may be connected to a respective one of the RF ports. Each RF port may be connected to a corresponding port of a radio (not shown), such as a radio that may be part of the base station antenna or mounted adjacent the base station antenna. Each phase shifter may have five outputs that are connected to respective ones of the radiating elements. Each phase shifter may divide an RF signal that is input thereto into five sub-components and may impart a phase progression to the sub-components of the RF signal that are provided to the radiating elements. In a typical implementation, a linear phase progression may be applied to the RF signals fed to the radiating elements in each array. As an example, the first radiating element in a linear array may be fed sub-components of a first RF signal that have a phase of Y°+2X°, the second radiating element in the linear array may be fed sub-components of the first RF signal that have a phase of Y°+X°, the third radiating element in the linear array may be fed sub-components of the first RF signal that have a phase of Y°, the fourth radiating element in the linear array may be fed sub-components of the first RF signal that have a phase of Y°−X°, and the fifth radiating element in the linear array may be fed sub-components of the first RF signal that have a phase of Y°−2X°.

One or more remote electronic tilt (RET) actuators may be used to physically adjust the settings of the phase shifters. A plurality of mechanical linkages may be used to transfer the motion of each RET actuator to a moveable element of a corresponding phase shifter or group of phase shifters. Each RET actuator may be controlled to generate a desired amount of movement of an output member thereof. The movement may comprise, for example, linear movement or rotational movement. The mechanical linkages (e.g., plastic or fiberglass RET rods) are used to translate the movement of the output member of each RET actuator to movement of the moveable element (e.g., a wiper arm, a sliding dielectric member, etc.) of one or more phase shifters that are associated with the RET actuator. The mechanical linkages may be adapted to extend between the output member of the RET actuator and the moveable elements of the corresponding phase shifters.

Figure 2:
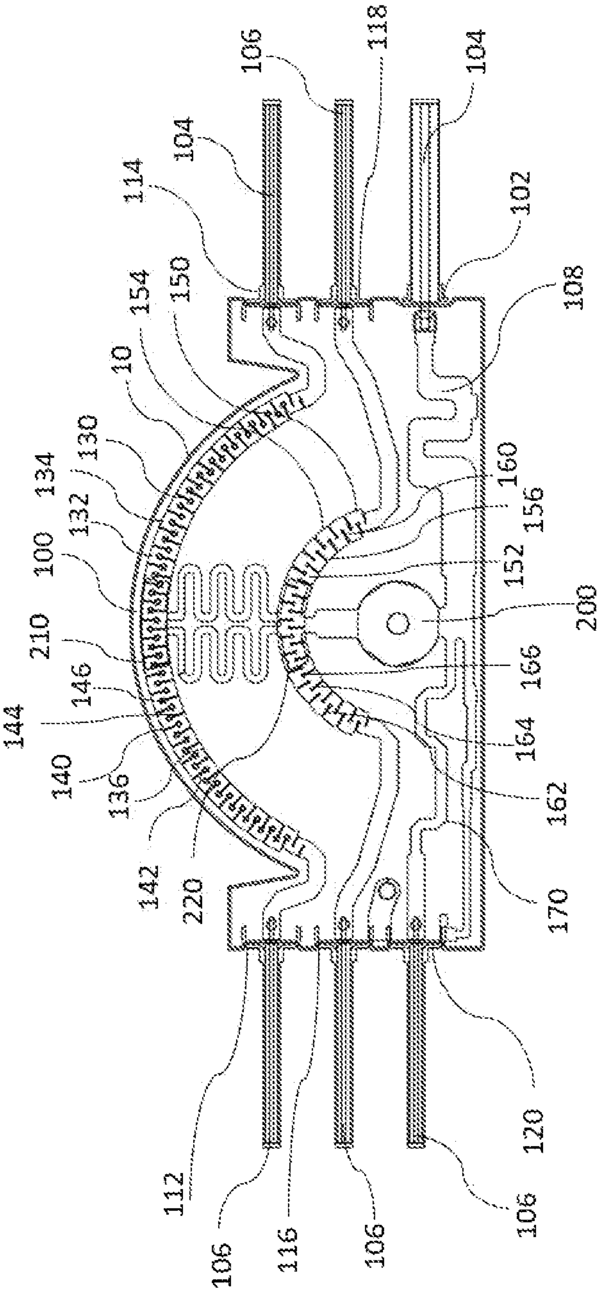
FIG. 2 is a top view of the phase shifter of FIG. 1.
Figure 5:
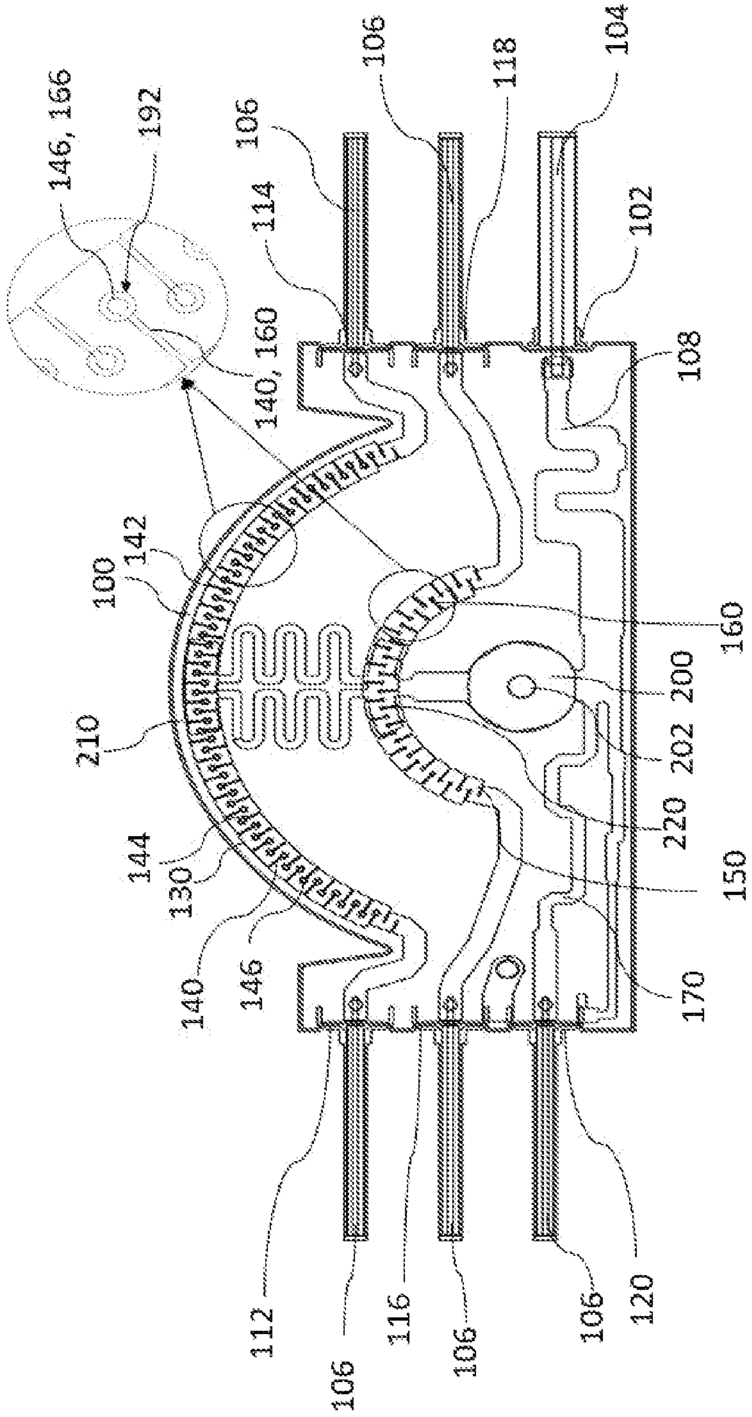
FIG. 5 is a top view of the phase shifter of FIG. 1 along with an enlarged view of components thereof, in which enlarged portions formed on the top metallization layer overlaps with a defective ground structure defined in the second metallization layer.

Referring to FIGS. 1, 2 and 5, a rotating wiper phase shifter assembly or "a phase shifter" 10 of the present disclosure is illustrated. The phase shifter 10 comprises an input and five outputs, and hence divides an RF signal input thereto into five sub-components and imparts a phase progression across those sub-components in a manner similar to that discussed above. The five-output phase shifter 10 could be used in base station antennas having more than five radiating elements per linear array (in order to further narrow the generated antenna beams in the elevation plane) by, for example, feeding each sub-component to, for example, between one and four radiating elements. It will also be appreciated that the phase shifter 10 may be modified to have more or less than five outputs. It will be appreciated that the wiper is typically implemented as a wiper printed circuit board having a microstrip transmission line formed thereon. In the FIGS. 1, 2 and 5, the ground plane and the dielectric substrate of the wiper printed circuit board is omitted so that the transmission line trace of the wiper printed circuit board and the transmission line traces on the underlying main printed circuit board are visible.

As shown in FIGS. 1, 2 and 5, the rotating wiper phase shifter 10 comprises a main (stationary) printed circuit board 100 and a rotatable wiper printed circuit board (or "a wiper") 200 that is rotatably mounted on the main printed circuit board 100. The wiper printed circuit board 200 may be pivotally mounted on the main printed circuit board 100 via a pivot pin 202. A position of the rotatable wiper printed circuit board 200 above the main printed circuit board 100 is controlled by a position of a drive shaft (not shown) that may be part of one of the mechanical linkages/RET actuators (not shown).

With reference to FIGS. 1, 2 and 5, the main printed circuit board 100 of the phase shifter 10 comprises an input port 102. The input port 102 is configured to receive a radio frequency (RF) signal. The main printed circuit board 100 further comprises a first output port 112, a second output port 114, a third output port 116 and a fourth port 118. Each of the first output port 112, the second output port 114, the third output port 116 and the fourth output port 118 is configured to output a respective phase-shifted sub-component of the RF signal that is received at the input port 102. In an embodiment, the main printed circuit board 100 comprises a fifth output port 120. The fifth output port 120 may be configured to output an additional phase-shifted sub-component of the RF signal. A coaxial cable 104 or other RF transmission cable component may be connected to the input port 102. A respective coaxial cable 106 or other RF transmission cable component may be connected to each respective output port 112, 114, 116, 118, 120, as shown in FIGS. 1, 2 and 5.

In accordance with the present disclosure, the main printed circuit board 100 comprises a first conductive trace 130 extending between the first output port 112 and the second output port 114. Further, the main printed circuit board 100 comprises a second conductive trace 150 extending between the third output port 116 and the fourth output port 118. The first conductive trace 130 and the second conductive trace 150 may be understood as electrical transmission lines that extend between the first and second output ports 112, 114, and the third and fourth output ports 116, 118, respectively. In the exemplary embodiment illustrated in FIGS. 1, 2 and 5, each of the first conductive trace 130 and the second conductive trace 150 is formed on the main printed circuit board 100 in a shape of an arc, with the first arcuate conductive trace 130 being disposed along an outer circumference of the main printed circuit board 100, and the second arcuate conductive trace 150 being disposed on a shorter radius concentrically within the outer first conductive trace 130. Moreover, the main printed circuit board 100 may comprise an input transmission line 108 that extends between the input port 102 of the main printed circuit board 100 and the wiper printed circuit board 200. Within the scope of the present disclosure, the first output port 112 and the second output port 114 are coupled to a first conductive pad 210 of the wiper printed circuit board 200 by the first conductive trace 130. Similarly, the third output port 116 and the fourth output port 118 are coupled to a second conducive pad 220 of the wiper printed circuit board 200 by the second conductive trace 150. Further, the input port 102 is coupled to the wiper printed circuit board 200 by the input transmission line 108. Accordingly, an RF signal input at the input port 102 can be transmitted to the first output port 112, the second output port 114, the third output port 116 and the fourth output port 118 via the wiper printed circuit board 200, the first conductive trace 130, the second conductive trace 150 and the input transmission line 108. In an embodiment, the first conductive pad 210 and the second conductive pad 220 are adapted to slide and/or move on the first conductive trace 130 and the second conductive trace 150, respectively, upon rotation of the wiper printed circuit board 200 relative to the main printed circuit board 100.

As shown in FIGS. 1, 2 and 5, the wiper printed circuit board 200 is rotatable relative to the main printed circuit board 100 about the pivot pin 202. As the wiper printed circuit board 200 rotates, portions of the wiper printed circuit board 200 that are arranged to electromagnetically couple with the first conductive trace 130 and the second conductive trace 150 (i.e., the first conductive pad 210 and the second conductive pad 220) move above the first conductive trace 130 and the second conductive trace 150, respectively. Thus, the electrical lengths of the respective signal transmission paths from the input port 102 to the first output port 112, the second output port 114, the third output port 116 and the fourth output port 118 change. The RF signal input at the input port 102 is transmitted to each of the first output port 112, the second output port 114, the third output port 116 and the fourth output port 118 through the changed transmission paths, and the phases of the output signals (at the respective output ports) also change accordingly.

Further, as shown in FIGS. 1, 2 and 5, the fifth output port 120 is directly coupled with the input port 102 via a third conductive trace 170 and the RF signal input at the input port 102 may be transmitted directly to the fifth output port 120, without passing through the wiper printed circuit board 200. It will be appreciated that an RF signal that is input to the phase shifter 100 at the input port 102 is split into two sub-components at the intersection of the wiper printed circuit board 200 and the third conductive trace 170, as the said intersection acts as a power divider, and that a first sub-component of the RF signal will pass to the wiper printed circuit board 200 while the second sub-component of the RF signal will pass to the fifth output port 120 via the third conductive trace 170. Likewise, a power divider (not visible) is provided on the wiper printed circuit board 200 that further sub-divides the first sub-component of the RF signal that is passed onto the wiper printed circuit board 200 into third and fourth sub-components so that the third sub-component is passed to the first conductive pad 210 while the fourth sub-component is passed to the second conductive pad 220. The portion of the third sub-component of the RF signal that couples from the first conductive pad 210 to the first conductive trace 130 is further sub-divided into fifth and sixth sub-components as it passes to the first conductive trace 130, with the fifth sub-component travelling in a first direction to the first output port 112, and the sixth sub-component travelling in a second direction to the second output port 114. Similarly, the portion of the fourth sub-component of the RF signal that couples from the second conductive pad 220 to the second conductive trace 150 is further sub-divided into seventh and eighth sub-components as it passes to the second conductive trace 150, with the seventh sub-component travelling in a first direction to the third output port 116, and the eighth sub-component travelling in a second direction to the fourth output port 118. Thus, the RF signal input at the input port 102 may eventually be sub-divided into five sub-components that are passed to the first output port 112, the second output port 114, the third output port 116, the fourth output port 118 and the fifth output port 120, respectively.

The sub-component of the RF signal that is passed to the fifth output port 120 undergoes a fixed phase shift (that is determined by, among other things, a length of the transmission path from the input port 102 to the fifth output port 120 and the frequency of the RF signal), while the sub-components of the RF signal that are passed to the first output port 112, the second output port 114, the third output port 116 and the fourth output port 118 are subjected to respective variable phase shifts, with the amount of the phase shifts depending upon the relative position of the wiper printed circuit board 200 above the first and second conductive traces 130, 150. Typically, the phase shifter 100 is designed so that when the wiper printed circuit board 200 is positioned above the respective mid-points of the first and second conductive traces 130, 150, the sub-components of the RF signals output at the output ports 112, 114, 116, 118 will all experience the same amount of phase shift/progression.

The first conductive trace 130 and the second conductive trace 150 are typically formed on the main printed circuit board 100 by way of applying a layer of metal on the main printed circuit board 100. One or more layers of metal may be applied on the main printed circuit board 100 to form the first and second conductive traces 130, 150. A first metal trace 132 is formed on the main printed circuit board 100 to form the first conductive trace 130 on the main printed circuit board 100. The first metal trace 132 may extend between the first output port 112 and the second output port 114 of the main printed circuit board 100. The first metal trace 132 may be understood as an arc of metal that has a first side edge 134, a second side edge 136 defined opposite to and concentric with the first side edge 134 and metal deposited between the first side edge 134 and the second side edge 136, as shown in FIG. 2.

In an embodiment, the first metal trace 132 is formed on the main printed circuit board 100 such that a plurality of slits 140 is formed in the first metal trace 132. Without deviating from the scope of the present disclosure, the plurality of slits 140 may be embodied as a segment or an area of the first metal trace 132 where the metal is omitted. In accordance with the present disclosure, the plurality of slits 140 may comprise a plurality of first transverse slits 142. The plurality of first transverse slits 142 may extend from the first side edge 134 of the first metal trace 132 towards the second side edge 136 of the first metal trace 132, as shown in FIGS. 2 and 5. The plurality of slits 140 may further comprise a plurality of second transverse slits 144. The plurality of second transverse slits 144 may extend from the second side edge 136 of the first metal trace 132 towards the first side edge 134 of the first metal trace 132, as shown in FIGS. 2 and 5. Because of the plurality of slits 140, the first conductive trace 130 of the main printed circuit board 100 is embodied as a meandered trace formed on the man printed circuit board 100. In some embodiments, the meandered trace of the first conductive trace 130 may be defined in a form of a periodic curve such that a slit 140 (of the plurality of slits 140) is defined between each set of adjacent amplitude lengths of the periodic curve of the first conductive trace 130.

Similarly, a second metal trace 152 is formed on the main printed circuit board 100 to form the second conductive trace 150 on the main printed circuit board 100. The second metal trace 152 may extend between the third output port 116 and the fourth output port 118 of the main printed circuit board 100. The second metal trace 152 may also be understood as an arc of metal that has a first side edge 154, a second side edge 156 defined opposite to and concentric with the first side edge 154 and metal deposited between the first side edge 154 and the second side edge 156.

In an embodiment, the second metal trace 152 is formed on the main printed circuit board 100 such that a plurality of slits 160 is formed in the second metal trace 152. Without deviating from the scope of the present disclosure, the plurality of slits 160 may be embodied as a segment or an area of the second metal trace 152 where the metal is omitted. In accordance with the present disclosure, the plurality of slits 160 may comprise a plurality of first transverse slits 162. The plurality of first transverse slits 162 may extend from the first side edge 154 of the second metal trace 152 towards the second side edge 156 of the second metal trace 152, as shown in FIGS. 2 and 5. The plurality of slits 160 may further comprise a plurality of second transverse slits 164. The plurality of second transverse slits 164 may extend from the second side edge 156 of the second metal trace 152 toward the first side edge 154 of the second metal trace 152, as shown in FIGS. 2 and 5. Because of the plurality of slits 160, the second conductive trace 150 of the main printed circuit board 100 is embodied as a meandered trace formed on the man printed circuit board 100. In some embodiments, the meandered trace of the second conductive trace 150 may be defined in a form of a periodic curve such that a slit 160 (of the plurality of slits 160) is defined between each set of adjacent amplitude lengths of the periodic curve of the second conductive trace 150.

The plurality of slits 140, 160 act to increase the electrical lengths of the first conductive trace 130 and the second conductive trace 150 without increasing a physical size of the main printed circuit board 100 and/or the phase shifter 10.

Further, in accordance with the present disclosure, with reference to FIGS. 2 and 5, each slit 140 of the plurality of slits 140 of the first metal trace 132 may include an enlarged portion 146 formed along a length of the slit 140. Similarly, each slit 160 of the plurality of slits 160 of the second metal trace 152 may include an enlarged portion 166 formed along a length of the slit 160. As is shown in FIG. 5, the enlarged portions 146, 166 of the plurality of slits 140, 160 may be embodied in a shape of a circle. In said exemplary embodiment illustrated in FIG. 5, the "circular" enlarged portions 146, 166 have been formed or defined at a tip of each slit 140, 160. Without deviating from the scope of the present disclosure, an enlarged portion 146, 166 may be embodied as a segment or an area of the first metal trace 132 and/or the second metal trace 152 where the metal is omitted.

In accordance with the present disclosure, the enlarged portions 146, 166 facilitate in reducing sharp edges in the first metal trace 132 and the second metal trace 152, and thus aid in reducing return loss in the phase shifter 10. Moreover, the enlarged portions 146, 166 formed in the first metal trace 132 and the second metal trace 152 aid in increasing an input impedance of the phase shifter 10.

Figure 3:
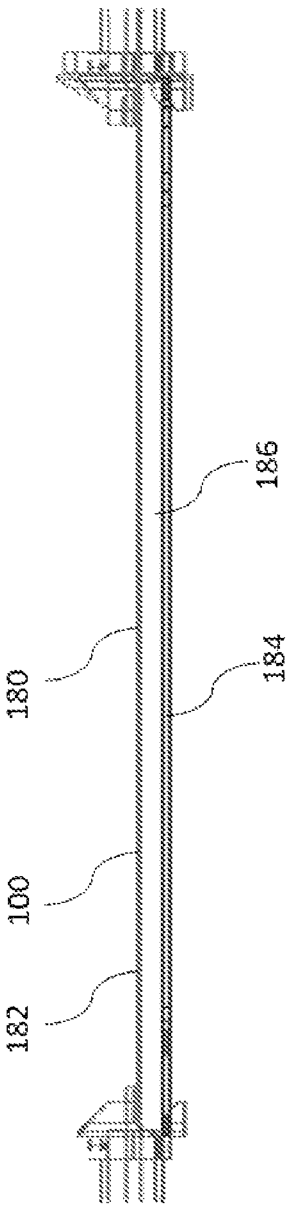
FIG. 3 is a side view of the phase shifter of FIG. 1 comprising a first "top" metallization layer, a second "bottom" metallization layer, and a dielectric layer arranged between the first and second metallization layers.
Figure 4:
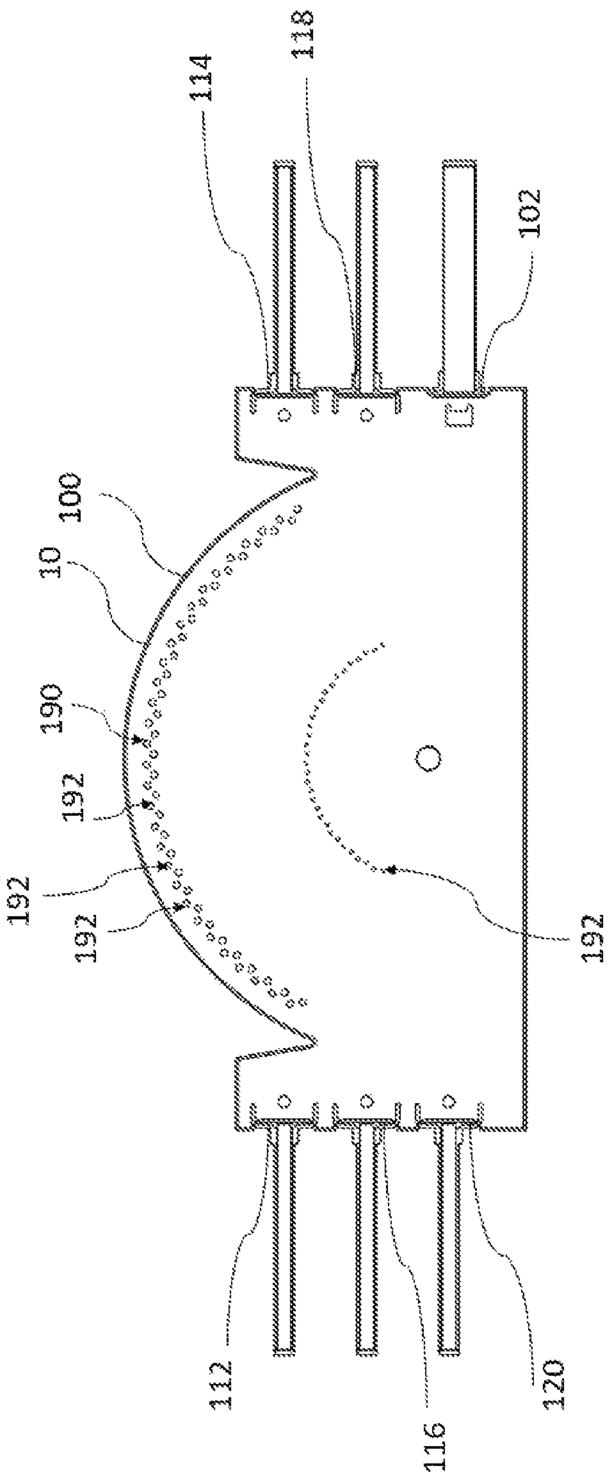
FIG. 4 is a bottom view of the phase shifter of FIG. 1.

Referring to FIG. 3, a side view of the main printed circuit board 100 of the phase shifter 10 of the present disclosure is illustrated. As shown in FIG. 3, the main printed circuit board 100 may include a dielectric substrate 180 that has a first or "top" metallization layer 182 on a top side thereof, and a second or "bottom" metallization layer 184 on a bottom side thereof. The dielectric substrate 180 may further comprise a dielectric layer 186 arranged between the first metallization layer 182 and the second metallization layer 184. The dielectric substrate 180 may be a low-loss dielectric substrate having a suitable dielectric constant. Within the scope of the present disclosure, the first metallization layer 182 of the dielectric substrate 180 may comprise the input port 102 and the output ports 112, 114, 116, 118, 120. The first metallization layer 182 may further comprise the first conductive trace 130 and the second conductive trace 150 (including the plurality of slits 140, 160 and the enlarged portions 146, 166) extending between the first and second output ports 112, 114 and the third and fourth outputs ports 116, 118, respectively.

Further, the dielectric substrate 180 of the main printed circuit board 100 comprises the second metallization layer 184 arranged below the first metallization layer 182. The second metallization layer 184 may comprise a ground plane layer. The ground plane layer may comprise a mostly solid layer of metal that is formed on the bottom surface of the dielectric substrate 180 of the main printed circuit board 100. The ground plane layer may act as the ground plane for input and output microstrip transmission lines with the dielectric substrate 180 separating the conductive traces 130 thereof from the ground plane layer. In an embodiment, outer conductors of the input and output coaxial cables 104, 106 may be soldered to the ground plane layer to provide a ground reference for the ground plane layer. Within the scope of the present disclosure, and with reference to FIGS. 3 and 4, the second metallization layer 184 of the main printed circuit board 100 may comprise defective ground structures 190 defined in the ground plane layer of the second metallization layer 184. Without deviating from the scope of the present disclosure, the defective ground structure 190 may be understood as a metal sheet having a plurality of openings 192. In an embodiment, the defective ground structure 190 may be embodied as metal omitted from the ground plane layer and/or the second metallization layer 184 of the main printed circuit board 100.

In accordance with the present disclosure, the first conductive trace 130 is configured to vertically overlap at least some of the openings 192 defined in the defective ground structure 190, as shown in FIG. 5. Particularly, the enlarged portions 146 of the first conductive trace 130 are configured to vertically overlap the at least some openings 192 defined in the defective ground structure 190. Similarly, in an embodiment, the second conductive trace 150 is also configured to vertically overlap at least some of the openings 192 defined in the defective ground structure 190. Particularly, the enlarged portions 166 of the second conductive trace 150 are configured to vertically overlap the at least some openings 192 defined in the defective ground structure 190. Within the scope of the present disclosure, the defective ground structure 190 defined in the second metallization layer 184 of the main printed circuit board 100 aids in further reducing the return loss in the phase shifter 10.

While the present disclosure has been described and explained with respect to a phase shifter 10 that comprises one input port, i.e., the input port 102 and five output ports, i.e., the first output port 112, the second output port 114, the third output port 116, the fourth output port 118 and the fifth output port 120, the above structural and functional features and aspects of the phase shifter 10 can be imported to other kinds of phase shifters comprised of one or more input ports and one or more output ports. Specifically, the structural and functional features and aspects of the first and second conductive traces 130, 150 comprising the plurality of slits 140, 160 and the enlarged portions 146, 166 formed along the length of the slits 140, 160 can be utilized in the phase shifters comprising one or more input ports and one or more output ports.

Figure 6:
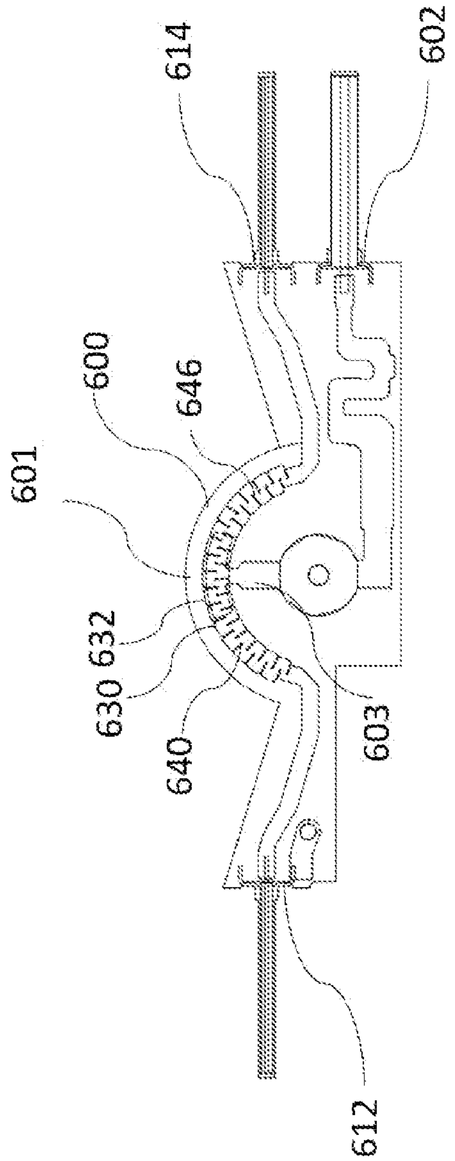
FIG. 6 is a top view of a phase shifter, in accordance with a first embodiment of the present disclosure.
Figure 7:
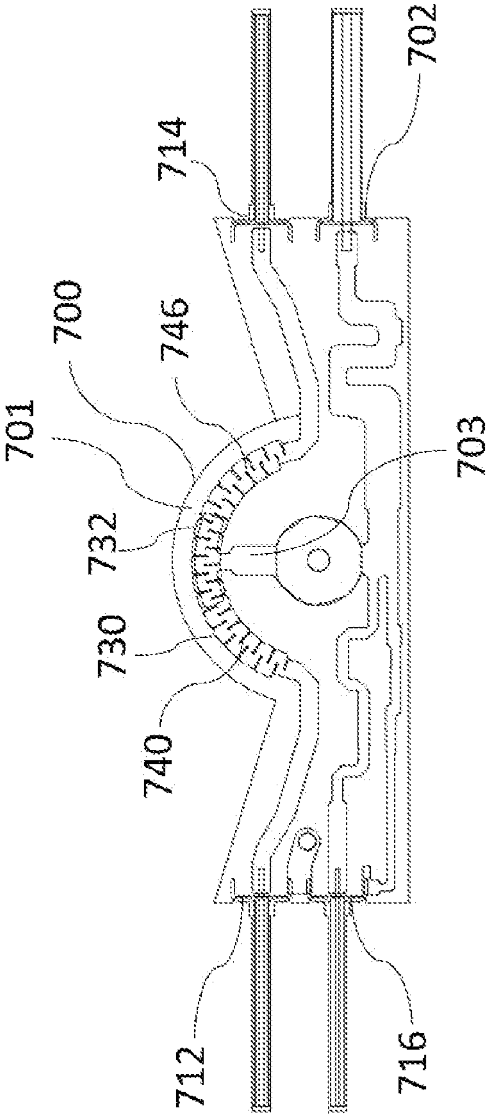
FIG. 7 is a top view of a phase shifter, in accordance with a second embodiment of the present disclosure.

For instance, FIG. 6 illustrates a top view of a phase shifter 600 comprising an input port 602 and two output ports, namely a first output port 612 and a second output 614. The phase shifter further 600 comprises a conductive trace 630 extending between the first output port 612 and the second output port 614. In accordance with the present disclosure, the conductive trace 630 comprises a metal trace 632 that is formed on a main printed circuit board 601 of the phase shifter 600 such that a plurality of slits 640 (as described above) is formed in the metal trace 632. Further, each slit 640 of the plurality of slits 640 of the metal trace 632 may include an enlarged portion 646 formed along a length of the slit 640. Further, FIG. 7 illustrates a top view of a phase shifter 700 comprising an input port 702 and three output ports, namely a first output port 712, a second output port 714 and a third output port 716. The phase shifter 700 further comprises a first conductive trace 730 extending between the first output port 712 and the second output port 714. In accordance with the present disclosure, the first conductive trace 730 comprises a metal trace 732 that is formed on a main printed circuit board 701 of the phase shifter 700 such that a plurality of slits 740 (as described above) is formed in the metal trace 732. Further, each slit 740 of the plurality of slits 740 of the metal trace 732 may include an enlarged portion 746 formed along a length of the slit 740. The third output port 716 may be configured to output an additional phase-shifted sub-component of an RF signal received at the input port 702. In an embodiment, the third output port 716 may be coupled to the input port 702 by a second conductive trace 750 and the RF signal input at the input port 702 may be transmitted directly to the third output port 716, without passing through the wiper printed circuit board 703.

Figure 8:
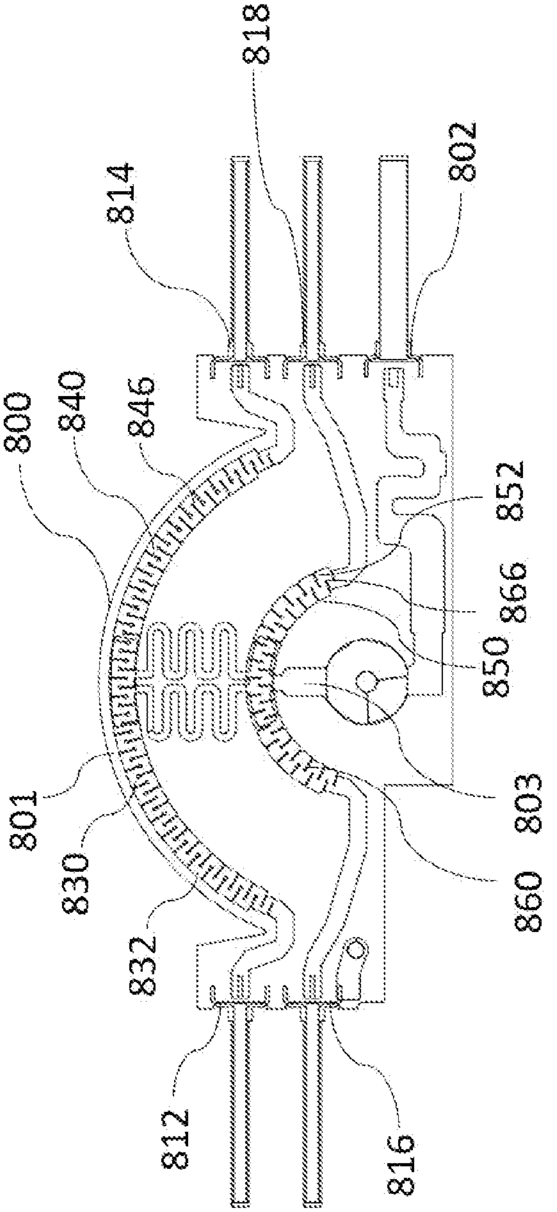
FIG. 8 is a top view of a phase shifter, in accordance with a third embodiment of the present disclosure.

Furthermore, FIG. 8 illustrates a top view of a phase shifter 800 comprising an input port 802 and four output ports, namely a first output port 812, a second output port 814, a third output port 816 and a fourth output port 818. The phase shifter 800 further comprises a first conductive trace 830 extending between the first output port 812 and the second output port 814, and a second conductive trace 850 extending between the third output port 816 and the fourth output port 818. In accordance with the present disclosure, the first and second conductive traces 830, 850 comprise a metal trace 832, 852 that is formed on a main printed circuit board 801 of the phase shifter 800 such that a plurality of slits 840, 860 (as described above) is formed in the metal trace 832, 852. Further, each slit 840, 860 of the plurality of slits 840, 860 of the metal trace 832, 852 may include an enlarged portion 846, 866 formed along a length of the slit 840, 860. Moreover, while the phase shifters 10, 600, 700, 800 have been described to comprise the first conductive trace 130, 630, 730, 830 and/or the second conductive trace 150, 850 extending in a shape of an arc, a person skilled in the art, without deviating from the scope of the present disclosure, can readily contemplate that the structural and functional features and aspects of the first and second conductive traces 130, 150 comprising the plurality of slits 140, 160 and the enlarged portions 146, 166 formed along the length of the slits 140, 160 can be imported/utilized in the phase shifters comprising the conductive traces in a linear manner between the respective ports.

Figure 9B:
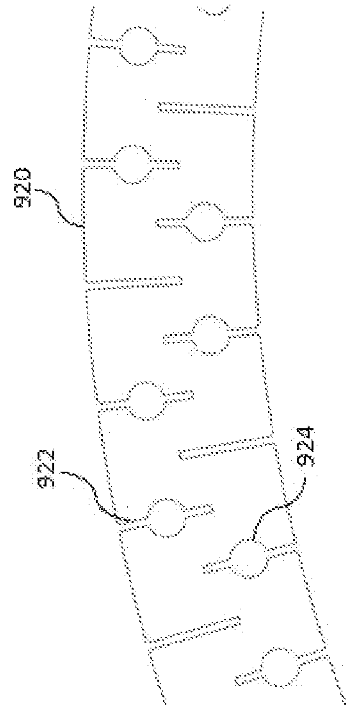
FIG. 9B is an illustration of the enlarged portions formed on the top metallization layer, in accordance with another embodiment of the present disclosure.
Figure 9A:
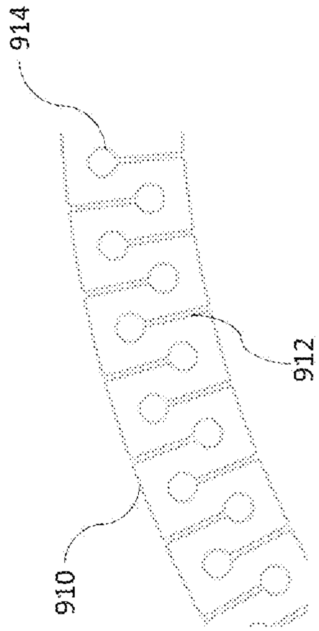
FIG. 9A is an illustration of the enlarged portions formed on the top metallization layer, in accordance with an embodiment of the present disclosure.
Figure 9C:
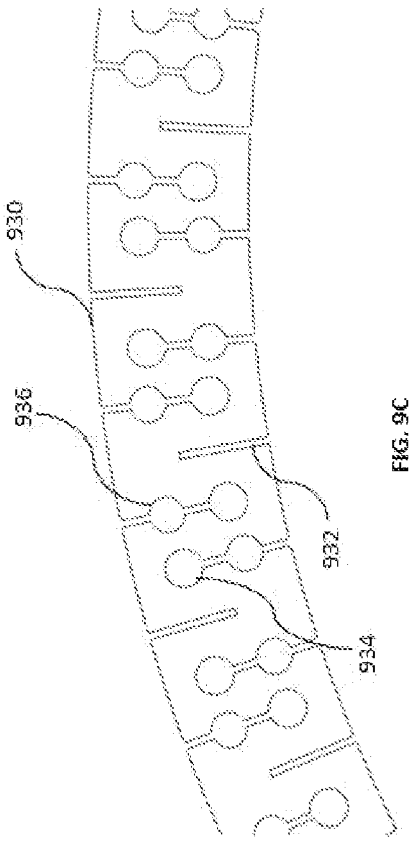
FIG. 9C is an illustration of the enlarged portions formed on the top metallization layer, in accordance with yet another embodiment of the present disclosure.

Further, while the present disclosure above has been described and explained with respect to the first conductive trace 130 and the second conductive trace 150 in which the enlarged portion 146, 166 has been embodied at the tip end of the slit 140, 160, a person skilled in the art can readily contemplate that the enlarged portions 146, 166 may be comprised at any position along the length of the slit 140, 160, without deviating from the scope of the present disclosure. For instance, FIG. 9A illustrates a top view of a portion of a conductive trace 910 that comprises a plurality of slits 912 in which an enlarged portion 914 of at least some of the slits 912 is formed at a tip end of the slit 912. Further, FIG. 9B illustrates a top view of a portion of a conductive trace 920 that comprises a plurality of slits 922 in which an enlarged portion 924 of at least some of the slits 922 is formed at a middle of a length of the slit 922. Furthermore, FIG. 9C illustrates a top view of a portion of a conductive trace 930 that comprises a plurality of slits 932 in which at least some of the slits 932 include a first enlarged portion 934 formed at a tip end of the slit 932 and a second enlarged portion 936 formed at a middle of the length of the slit 932.

Figure 10B:
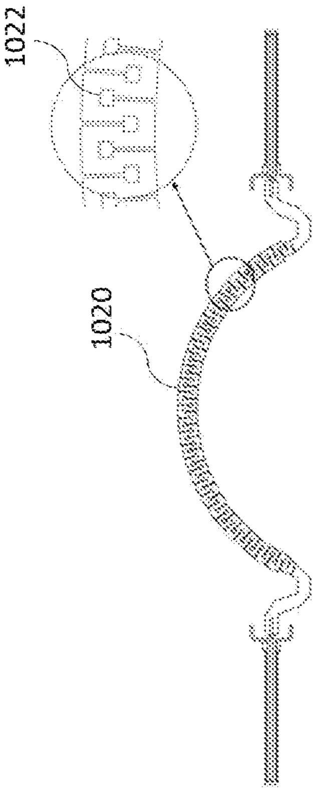
FIG. 10B is an illustration of the enlarged portions in a shape of "square" on the top metallization layer, in accordance with another embodiment of the present disclosure.
Figure 10A:
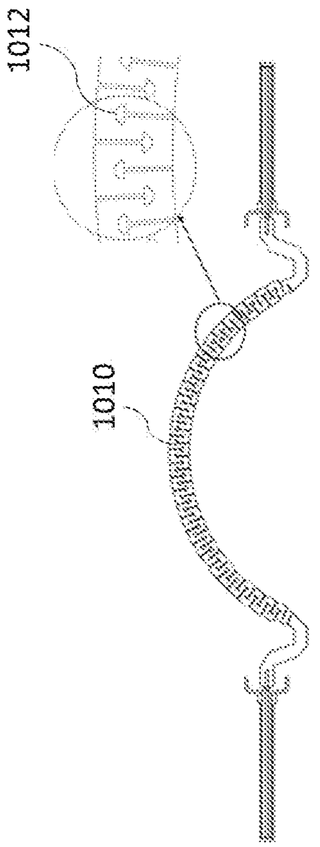
FIG. 10A is an illustration of the enlarged portions in a shape of "semi-circle" on the top metallization layer, in accordance with an embodiment of the present disclosure.
Figure 10C:
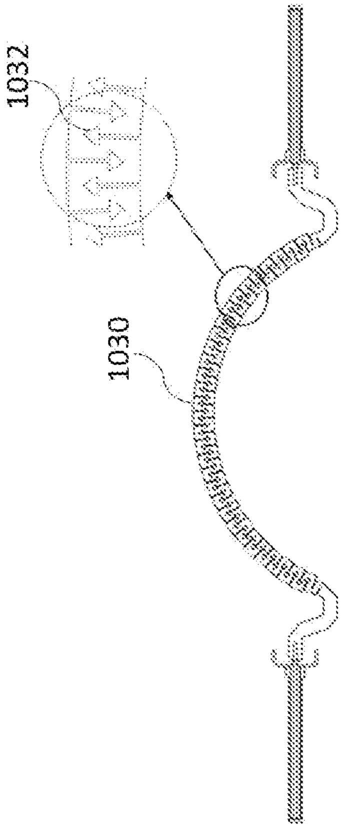
FIG. 10C is an illustration of the enlarged portions in a shape of "triangle" on the top metallization layer, in accordance with yet another embodiment of the present disclosure.

Further, while the present disclosure has been described and explained in respect of the first conductive trace 130 and the second conductive trace 150 in which the enlarged portion 146, 166 is embodied in a shape of a circle, a person skilled in the art can readily contemplate that the enlarged portion 146, 166 may be embodied in any suitable shape that facilitates the structural and functional aspects of the enlarged portions 146, 166 discussed above. For instance, FIG. 10A illustrates a conductive trace 1010 in which enlarged portions 1012 are embodied in shape of "semi-circle". FIG. 10B illustrates a conductive trace 1020 in which enlarged portions 1022 are embodied in shape of "square". Also, FIG. 10C illustrates a conductive trace 1030 in which enlarged portions 1032 are embodied in shape of "triangle".

Within the scope of the present disclosure, the phase shifter 10 of the present disclosure offers an increased electrical length of conductive trace trace(s) 130, 150 compared to the known phase shifters. The phase shifter 10 of the present disclosure facilitates increasing the electrical length of the conductive trace 130, 150 without increasing the physical length of the phase shifter 10. In fact, the phase shifter 10 of the present disclosure facilitates an increased electrical length of the conductive trace 130, 150 with same or reduced physical length of the phase shifter 10. Accordingly, with the phase shifter 10 of the present disclosure, more phase shift/phase tilt can be obtained without increasing the physical size of the phase shifter and without effecting the other performances, for example, return loss, amplitude, etc., of the phase shifter.

Moreover, the enlarged portions 146, 166 formed along the length of the slits 140, 160 provide more phase tilt/phase shift on the conductive trace length, and aids in increasing the impedance offered by the phase shifter 10. Further, the enlarged portions 146, 166 comprised of no sharp edges, for example, the enlarged portions 146, 166 formed in the shape of circle, provides uniform surface and reduces return loss in the phase shifter 10. Also, the defective ground structure 190 aids in further reducing the return loss in the phase shifter 10.

In accordance with the present disclosure, FIG. 11 provides a table that demonstrates a difference in the phase shift/phase tilt offered by the phase shifter comprising the conductive trace of the present disclosure compared to the phase shifter having a meandered track (base), at any given frequency. For instance, FIG. 11 provides that at a given frequency of 0.8085 GHz, the phase tilt offered by a phase shifter having a meandered track base (i.e., without any enlarged portion formed along a length of slits) is around "−114.407" degrees. However, at the same given frequency of 0.8085 GHz, the phase tilt offered by the phase shifter 10 having the conductive trace 130 with enlarged portions 146 (in shape of "circle" with diameter of 1 mm) is around "−163.226" degrees. Accordingly, a person skilled in the art can readily contemplate that the phase shifter 10 having the conductive trace 130 with enlarged portions 146 (in shape of "circle" with diameter of 1 mm) facilitates an increased phase shift/tilt of around "−48.8197" degrees.

The various embodiments of the present disclosure have been described above with reference to the accompanying drawings. The present disclosure is not limited to the illustrated embodiments; rather, these embodiments are intended to fully and completely disclose the subject matter of the disclosure to those skilled in this art. In the drawings, like numbers refer to like elements throughout. Thicknesses and dimensions of some components may be exaggerated for clarity.

Spatially relative terms, such as "under", "below", "lower", "over", "upper", "top", "bottom" and the like, may be used herein for ease of description to describe one element or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Herein, the terms "attached", "connected", "interconnected", "contacting", "mounted", "coupled" and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, operations, elements, and/or components, but do not preclude the presence or addition of one or more other features, operations, elements, components, and/or groups thereof.

While considerable emphasis has been placed herein on the particular features of this disclosure, it will be appreciated that various modifications can be made, and that many changes can be made in the preferred embodiments without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

The embodiments herein and the various features and advantageous details thereof are explained with reference to the non-limiting embodiments in the description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles and the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

What is claimed is:

1. A phase shifter, comprising:

an input port configured to receive a radio frequency (RF) signal;

a first conductive trace that is electrically connected to a first output port, the first output port configured to output a first phase-shifted sub-component of the RF signal; and a wiper configured to couple the input port to the first conductive trace, the wiper comprising a first conductive pad adapted to slide on the first conductive trace, wherein the first conductive trace comprises a first metal trace that has a plurality of slits formed therein where the metal is omitted, and wherein each slit includes an enlarged portion formed along a length thereof.

2. The phase shifter as claimed in claim 1, wherein the plurality of slits comprises a plurality of first transverse slits that extend from a first side edge of the first metal trace toward a second side edge that is opposite the first side edge, and a plurality of second transverse slits that extend from the second side edge of the first metal trace toward the first side edge.

3. The phase shifter as claimed in claim 2, wherein the first conductive trace is a meandered trace.

4. The phase shifter as claimed in claim 3, wherein the meandered trace forms a periodic curve.

5. The phase shifter as claimed in claim 4, wherein the first conductive trace is electrically connected to a second output port and the second output port is configured to output a second phase-shifted sub-component of the RF signal.

6. The phase shifter as claimed in claim 5, comprising:

a second conductive trace that is electrically connected to a third output port, the third output port configured to output a third phase-shifted sub-component of the RF signal; and the wiper is configured to couple the input port to the second conductive trace, the wiper comprising a second conductive pad adapted to slide on the second conductive trace, wherein the second conductive trace comprises a second metal trace that has a plurality of slits formed therein where the metal is omitted, and wherein each slit includes an enlarged portion formed along a length thereof.

7. The phase shifter as claimed in claim 1, wherein the enlarged portion of at least some of the slits is formed at a tip end of the slit.

8. The phase shifter as claimed in claim 1, wherein the enlarged portion of at least some of the slits is formed at a middle of the length of the slit.

9. The phase shifter as claimed in claim 1, wherein at least some of the slits include a first enlarged portion formed at a tip end of the slit and a second enlarged portion formed at a middle of the length of the slit.

10. The phase shifter as claimed in claim 5, wherein the first conductive trace extends linearly between the first output port and the second output port.

11. The phase shifter as claimed in claim 5, wherein the first conductive trace extends between the first output port and the second output port in a shape of an arc.

12. The phase shifter as claimed in claim 1, further comprising a dielectric substrate that has a first side on which the first conductive trace is formed and a second side, wherein a defective ground structure is provided on the second side of the dielectric substrate, the defective ground structure comprising a metal sheet having a plurality of openings therein where the metal is omitted.

13. The phase shifter as claimed in claim 12, wherein the first conductive trace vertically overlaps at least some of the openings in the defective ground structure.

14. The phase shifter as claimed in claim 6, wherein the second conductive trace is electrically connected to a fourth output port and the fourth output port is configured to output a fourth phase-shifted sub-component of the RF signal.

15. The phase shifter as claimed in claim 14, further comprising a third conductive trace coupled to a fifth output port, the fifth output port configured to output a fifth phase-shifted sub-component of the RF signal.

16. The phase shifter as claimed in claim 1, wherein the enlarged portion of at least some of the slits have a shape of a circle, semi-circle, triangle, or square.

17. A phase shifter, comprising:

an input port configured to receive a radio frequency (RF) signal;

a first conductive trace extending between a first output port and a second output port;

a second conductive trace extending between a third output port and a fourth output port;

each of the first output port, the second output port, the third output port and the fourth output port configured to output a respective phase-shifted sub-component of the RF signal; and a wiper configured to couple the input port to the first conductive trace and the second conductive trace, the wiper comprising a first conductive pad and a second conductive pad adapted to slide on the first conductive trace and the second conductive trace, respectively, wherein slits extend into the first conductive trace and the second conductive trace so that the first conductive trace and the second conductive trace are meandered traces, and wherein each slit includes an enlarged portion formed along a length thereof.

18. The phase shifter as claimed in claim 17, wherein each meandered trace forms a periodic curve.

19. The phase shifter as claimed in claim 18, wherein the enlarged portion of at least some of the slits is formed either at a tip end of the slit or at a middle of the length of the slit.

20. The phase shifter as claimed in claim 18, wherein at least some of the slits include a first enlarged portion formed at a tip end of the slit, and a second enlarged portion formed at a middle of the length of the slit.

* * * * *